Patented Apr. 10, 1923.

1,451,299

UNITED STATES PATENT OFFICE.

RICHARD HAYNN AND FERDINAND MÜNZ, OF FECHENHEIM-ON-THE-MAIN, GERMANY, ASSIGNORS TO LEOPOLD CASSELLA & CO. GESELLSCHAFT MIT BESCHRÄNKTER HAFTUNG, A CORPORATION OF GERMANY.

PROCESS FOR THE PRODUCTION OF SHOT EFFECTS, NOT TO BE STAINED IN PIECE DYEING.

No Drawing. Application filed May 6, 1922. Serial No. 559,061.

*To all whom it may concern:*

Be it known that we, RICHARD HAYNN, a subject of the German Republic, residing at Fechenheim-on-the-Main, Germany, Waldstrasse 13, and FERDINAND MÜNZ, a subject of the Austrian Republic, residing at Fechenheim-on-the-Main, Germany, Haingrabenstrasse 10, have invented a certain new and useful Process for the Production of Shot Effects, Not to be Stained in Piece Dyeing, of which the following is a full description.

Various methods of preparing animal or vegetable fibres in such a manner that they do not absorb dyestuff in piece-dyeing, have already been recommended. These methods, however, have certain drawbacks; either the fibres are impaired or the resistance against staining is unsatisfactory. Among the materials recommended for preparing cotton acetic anhydride has been named. For preparing wool and other animal fibres for shot-effects acetic anhydride has not been used so far.

We have now found that by a simple treatment with acetic anhydride with the addition of a catalyzer animal fibres undergo such a change as to become suitable for shot-effects. A small addition of a weak base exerts a favorable influence. In preparing effects already dyed, an aftertreatment with chromium salts has been found useful.

*Example.*—Woolen yarn, previously dyed with dyestuffs fast to milling and acids, is treated at the ordinary temperature, occasionally turning the material, in a mixture five times its weight, consisting of 100 parts acetic anhydride, 400 parts glacial acetic acid and 6 parts sulphuric monohydrate; after a treatment of some duration rinse and treat for ½ hour with 3% chromium fluoride, reckoned on the weight of the wool; finally rinse and dry.

Other anhydrides of organic acids may take the place of acetic anhydride and other catalyzers that of sulphuric acid.

Having thus described our invention what we claim as new and desire to secure by Letters Patent is as follows:

1. A process for the production of shot-effects not to be stained in piece-dyeing, by treating animal fibres in a mixture of acetic anhydride and glacial acetic acid with the addition of catalyzers.

2. The process described in claim 1 with the use of sulphuric acid as a catalyzer.

In witness whereof we have hereunto signed our names this 13th day of April, 1922.

RICHARD HAYNN.
FERDINAND MÜNZ.

Witnesses:
BASIL E. SAVARG,
THOS. H. ANDERSON.